Patented Feb. 11, 1936

2,030,792

UNITED STATES PATENT OFFICE 2,030,792

WATER-MISCIBLE VITAMIN PREPARATIONS CONTAINING VITAMIN D

Charles W. Hooper, Sharon, Conn., assignor to Winthrop Chemical Company, Inc., New York, N. Y., a corporation of New York No Drawing. Application December 4, 1935, Serial No. 52,827. In Canada February 25, 1935

10 Claims. (Cl. 167—81)

This invention relates to improvements in water-miscible vitamin preparations containing the lipoid-soluble vitamin D and methods of preparing the same and is a continuation in part of my copending application Serial Number 728,087, filed May 29, 1934. It relates more particularly to water-miscible propanediol and butanediol solutions of vitamin D, which are not only stable but also are more effective than cod liver oil or oil solutions of irradiated or activated ergosterol of similar vitamin D "rat unit" potency for the prevention and cure of rickets in infants.

Vitamin D has usually been administered heretofore in the form of cod liver oil or in the form of solutions of irradiated or activated ergosterol in oils. Concentrates from fish liver or fish liver oils have also been administered in the form of oil solutions of such concentrates. These preparations, however, do not satisfactorily meet the requirements for a marketable product containing vitamin D. It is difficult to administer cod liver oil or oil solutions of irradiated or activated ergosterol to an infant not educated to the use of a spoon and such preparations are often poured or dropped into the infant's mouth with the attendant inaccuracy of dosage due to spilling or drooling. It is also very difficult to administer either cod liver oil or oil solutions of irradiated or activated ergosterol admixed with water, fruit juice, milk, etc., for the reason that neither the oil base nor the vitamin concentrate per se is miscible with water.

My investigations of water-miscible vitamin preparations containing vitamin D have shown that the vehicle employed for the production of such preparations should (1) be non-toxic, (2) be capable of holding a sufficient amount of the vitamin in solution to give the required therapeutic concentration, (3) have a sufficiently high boiling point to prevent vaporization of the solvent and consequent change in the concentration of the preparation, (4) not be too viscous, (5) not be too hygroscopic, (6) be very miscible with water and aqueous solutions, and (7) form stable solutions of vitamin D.

I have now found that the propanediols and certain butanediols satisfy the above requirements and that solutions of vitamin D in propanediols and certain butanediols possess very desirable properties. The vitamin D in such solutions is exceptionally stable and such solutions may be conveniently and accurately fed to infants in water, fruit juice, milk, soups and the like. On dilution with water, aqueous solutions or emulsions, a very finely dispersed suspension or colloidal solution of the vitamins is obtained which persists without flocculation for a considerable period of time. This is very surprising because my researches have shown that other polyhydric alcohols such as ethylene glycol and glycerin cannot be used to produce vitamin D preparations which are satisfactory. My investigations have shown that not all of the butanediols give satisfactory solutions of vitamin D. I have found that solutions of crystalline vitamin D in 2-methyl-1,2-propanediol are completely decomposed after 3 weeks' incubation at 37° C. Such solutions, after being subjected to the indicated conditions, contained little or no vitamin D. For purposes of convenience, the word "butanediol", therefore, is generically employed in this specification to mean the group consisting of 1,2-butanediol, 1,3-butanediol, 2,3-butanediol, 1,4-butanediol and 2-methyl-1,3-propanediol. It is furthermore most surprising to find that even the two propanediols themselves differ, the 1,2-propanediol giving preparations which are considerably more stable than the preparations obtained by using 1,3-propanediol as a solvent.

The preparation of the water-miscible vitamin preparations containing vitamin D is illustrated by the following examples in connection with which, however, it should be noted that the invention is not limited to the specific products the preparation of which is illustrated or to the specific procedures and proportions described, excepting as may be indicated in the appended claims. In this connection it is noted particularly that the invention is not limited to the use of the particular sources named for the vitamin D.

Example 1

Suspend 100 grams of a vitamin A and D preparation (obtainable from cod liver oil, other fish liver oils or fish livers, for example by saponifying with alkalies and extracting the unsaponifiable matter by means of an organic solvent) in 1000 grams of 1,2-propanediol and gently heat the mixture to approximately 40° C. with the exclusion of air by means of an inert gas such as carbon dioxide, for 2 hours. The mixture is then cooled and centrifuged. The resulting clear solution containing the lipoid-soluble vitamins is separated from the insoluble matter and assayed for its vitamin A and D potency. The solution is clear and when mixed with an excess of water or milk yields a very finely dispersed suspension or colloidal solution.

Example 2

Suspend 10 grams of irradiated ergosterol in 1000 grams of 1,2-propanediol. Heat the mixture to approximately 40° C., with the exclusion of air, by means of an inert gas such as carbon dioxide, for two hours. The mixture is then cooled and centrifuged. The resulting clear solution containing the vitamin D is separated from the insoluble matter and assayed for its vitamin D potency. It is then diluted to the desired vitamin D potency with 1,2-propanediol. The solution is clear and when mixed with water or milk yields a very finely dispersed suspension or colloidal solution which persists without flocculation for a prolonged period.

Example 3

300 milligrams of a crystalline antirachitically highly active transformation product of ergosterol such as that described in U. S. Patent 1,902,785 at page 2, lines 44–70, which melts at 116° to 117° C. and has a specific rotation of $$\left[\alpha\right]_D^{20} = +81.5°$$

in acetone, are dissolved in 1000 grams of 1,2-propanediol at room temperature, with the exclusion of air, by means of an inert gas such as carbon dioxide. The resulting solution is clear and colorless. It has been shown by assay that the solution contains in each gram approximately 12,000 U. S. P. units of vitamin D. The solution shows excellent dispersion qualities in water, milk, etc. One drop containing approximately 300 U. S. P. units of vitamin D forms a water-clear colloidal solution in 30 cc. of distilled water.

In Examples 1, 2 and 3, 1,3-propane-diol may be substituted for 1,2-propane-diol or mixtures of both may be employed to produce solutions which are similar to those described above.

Example 4

Suspend 75 grams of a vitamin A and D preparation (obtained from tuna liver oil by saponifying with alkalies and extracting the unsaponifiable matter by means of an organic solvent) in 1000 grams of 1,2-butanediol, with the exclusion of air by means of an inert gas such as nitrogen, and allow to stand at room temperature in the dark for 48 hours. The mixture is then centrifugalized. The resulting clear solution containing the lipoid-soluble vitamins is separated from the insoluble matter and assayed for its vitamin A and D potency. This solution is clear and when mixed with an excess of water or milk, yields a finely dispersed suspension or colloidal solution.

Example 5

Suspend 10 grams of irradiated or activated ergosterol in 1000 grams of 1,2-butanediol. Allow to stand at room temperature in a tightly stoppered glass container for one week. The mixture is then filtered through cotton until clear. The resulting clear solution containing the lipoid-soluble vitamin D is assayed for its vitamin D potency and adjusted to contain 20,000 U. S. P. vitamin D units per gram by adding a sufficient quantity of 1,2-butanediol. This solution is clear and shows excellent dispersion qualities in water, milk, etc. One gram forms a water-clear solution in 50 cc. of distilled water.

Example 6

250 milligrams of a crystalline antirachitically highly active transformation product of ergosterol such as that described in U. S. Patent 1,902,785 at page 2, lines 44–70, which melts at 116° to 117° C. and has a specific rotation of $$\left[\alpha\right]_D^{20} = +81.5°$$

in acetone, are dissolved in 1000 grams of 1,2-butanediol at approximately 40° C., with the exclusion of air by means of an inert gas such as carbon dioxide. The resulting clear solution has been shown by assay to contain in each gram approximately 10,000 U. S. P. units of vitamin D. One gram dispersed in 25 liters of milk by stirring prepares a milk uniformly containing 400 U. S. P. units of vitamin D per liter.

In Examples 4, 5 and 6, 1,3-butanediol, 2,3-butanediol, 1,4-butanediol or 2-methyl-1,3-propanediol or mixtures containing more than one of these butanediols may be substituted for the specifically described 1,2-butanediol. As will be evident from Examples 1 and 4, the propane- and butane-diol solutions of vitamin D may also contain vitamin A.

A portion of the propanediols and butanediols in the above described solutions can be replaced by other liquids, such as, for example, water, alcohol, ethylene glycol and glycerine. The use of mixed solvents other than the propanediols and butanediols is not recommended, however, since an excess of any of the above mentioned replacement solvents usually results in unsatisfactory products. The addition of large amounts of water, for example, lowers the solubility of vitamin D in the propanediols and butanediols. The addition of large amounts of ethylene glycol or glycerine produces a like result. Furthermore, vitamin solutions containing such admixed solvents are not as stable as vitamin solutions containing only propanediols and/or butanediols as solvents.

It is evident that the exact source of the vitamin D is not material, since I may employ a naturally occurring vitamin D as found in fish liver oil, an irradiated ergosterol, a vitamin D product prepared by cathode ray activation or any other suitable vitamin D product.

I have thoroughly tested out the above water-miscible propanediol and butanediol vitamin preparations for stability. Relatively old solutions thereof stored in well filled, tightly stoppered amber bottles have retained their full vitamin D potency even at a temperature of 35° C. I have had the solutions tested in the hospital for the prevention and cure of rickets in infants and the results have been most satisfactory. A daily dose of one drop of the preparation, prepared according to Example 3 and containing approximately 300 U. S. P. units of vitamin D, administered in the infant's milk has been found to be just as effective as 750 U. S. P. units of vitamin D administered in the form of cod liver oil when employed clinically as an antiratchitic agent. The preparations are easily administered in the manner outlined above.

I claim:

1. A vitamin D stable water-miscible vitamin preparation containing an antirachitic vitamin D dissolved in a solvent selected from the group consisting of the propanediols, 1,2-butanediol, 1,3-butanediol, 2,3-butanediol, 1,4-butanediol and 2-methyl-1,3-propanediol.

2. A vitamin D stable water-miscible vitamin preparation containing a crystalline antirachitically highly active transformation product of ergosterol which melts at 116° to 117° C. and has a specific rotation of $$\left[a\right]_D^{20} = +81.5°$$

in acetone, dissolved in a solvent selected from the group consisting of the propanediols, 1,2-butanediol, 1,3-butanediol, 2,3-butanediol, 1,4-butanediol and 2-methyl-1,3-propanediol.

3. A vitamin D stable water-miscible vitamin preparation containing an antirachitic vitamin D dissolved in a propanediol.

4. A vitamin D stable water-miscible vitamin preparation containing a crystalline antirachitically highly active transformation product of ergosterol which melts at 116° to 117° C. and has a specific rotation of $$\left[a\right]_D^{20} = +81.5°$$

in acetone, dissolved in a propanediol.

5. A vitamin D stable water-miscible vitamin preparation containing an antirachitic vitamin D dissolved in 1,2-propanediol.

6. A vitamin D stable water-miscible vitamin preparation containing a crystalline antirachitically highly active transformation product of ergosterol which melts at 116° to 117° C. and has a specific rotation of $$\left[a\right]_D^{20} = +81.5°$$

in acetone, dissolved in 1,2-propanediol.

7. A vitamin D stable water-miscible vitamin preparation containing an antirachitic vitamin D dissolved in 1,3-propanediol.

8. A vitamin D stable water-miscible vitamin preparation containing a crystalline antirachitically highly active transformation product of ergosterol which melts at 116° to 117° C. and has a specific rotation of $$\left[a\right]_D^{20} = +81.5°$$

in acetone dissolved in 1,3-propanediol.

9. A vitamin D stable water-miscible vitamin preparation containing an antirachitic vitamin D dissolved in 1,2-butanediol.

10. A vitamin D stable water-miscible vitamin preparation containing a crystalline antirachitically highly active transformation product of ergosterol which melts at 116° to 117° C. and has a specific rotation of $$\left[a\right]_D^{20} = +81.5°$$

in acetone dissolved in 1,2-butanediol.

CHARLES W. HOOPER.